US009875445B2

(12) United States Patent
Amer et al.

(10) Patent No.: US 9,875,445 B2
(45) Date of Patent: Jan. 23, 2018

(54) DYNAMIC HYBRID MODELS FOR MULTIMODAL ANALYSIS

(71) Applicant: SRI International, Menlo Park, CA (US)

(72) Inventors: Mohamed R. Amer, New York, NY (US); Behjat Siddiquie, Plainsboro, NJ (US); Ajay Divakaran, Monmouth Junction, NJ (US); Colleen Richey, Cupertino, CA (US); Saad Khan, Hamilton, NJ (US); Hapreet S. Sawhney, Princeton Junction, NJ (US); Timothy J. Shields, Lumberton, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 14/631,124

(22) Filed: Feb. 25, 2015

(65) Prior Publication Data
US 2016/0071024 A1    Mar. 10, 2016

Related U.S. Application Data

(60) Provisional application No. 61/944,079, filed on Feb. 25, 2014.

(51) Int. Cl.
*G06N 99/00*    (2010.01)
*G06N 7/00*    (2006.01)
*G06K 9/62*    (2006.01)

(52) U.S. Cl.
CPC ......... *G06N 99/005* (2013.01); *G06K 9/6296* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 6,499,025 B1* | 12/2002 | Horvitz | ............. | G06K 9/00234 342/64 |
| 6,526,395 B1* | 2/2003 | Morris | ................... | G06N 3/004 706/15 |
| 7,203,635 B2* | 4/2007 | Oliver | ................. | G06K 9/6293 345/156 |
| 8,437,506 B2 | 5/2013 | Williams et al. | | |
| 8,886,222 B1* | 11/2014 | Rodriguez | ............ | G01C 21/20 455/456.1 |
| 8,953,844 B2 | 2/2015 | Williams et al. | | |
| 2006/0122834 A1 | 6/2006 | Bennett | | |

(Continued)

OTHER PUBLICATIONS

Chang et al., CBSA: Content-Based Soft Annotation for Multimodal Image Retrieval Using Bayes Point Machines, Jan. 2003, IEEE Transactions on Circuits and Systems for Video Technology, vol. 13, No. 1, pp. 26-38.*

(Continued)

*Primary Examiner* — Alan Chen
(74) *Attorney, Agent, or Firm* — Moser Taboada

(57) ABSTRACT

Technologies for analyzing temporal components of multimodal data to detect short-term multimodal events, determine relationships between short-term multimodal events, and recognize long-term multimodal events, using a deep learning architecture, are disclosed.

20 Claims, 4 Drawing Sheets

(56) References Cited

U.S. PATENT DOCUMENTS

| | | | |
|---|---|---|---|
| 2008/0091628 A1* | 4/2008 | Srinivasa | G06N 3/08 |
| | | | 706/12 |
| 2012/0052476 A1 | 3/2012 | Graesser et al. | |
| 2013/0226850 A1* | 8/2013 | Hannuksela | G10L 25/48 |
| | | | 706/14 |
| 2014/0164913 A1 | 6/2014 | Jaros et al. | |
| 2014/0222425 A1 | 8/2014 | Park et al. | |
| 2014/0223462 A1 | 8/2014 | Aimone et al. | |
| 2014/0357312 A1 | 12/2014 | Davis et al. | |
| 2014/0372112 A1 | 12/2014 | Xue et al. | |
| 2015/0006443 A1 | 1/2015 | Rose et al. | |

OTHER PUBLICATIONS

"Deep learning", available at http://en.wikipedia.org/wiki/Deep_learning, accessed May 20, 2015, 29 pages.

Amer et al., "Emotion Detection in Speech Using Deep Networks", SRI International, May 2014, 5 pages.

Amer et al., "Multimodal Fusion using Dynamic Hybrid Models", Mar. 2014, 8 pages.

U.S. Appl. No. 61/944,079, filed Feb. 25, 2014, 17 pages.

* cited by examiner

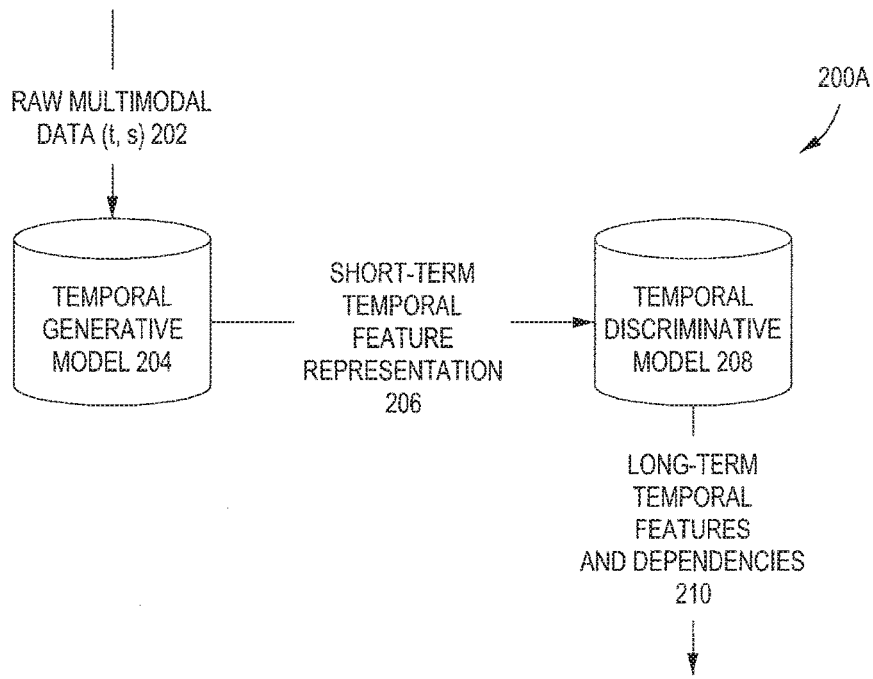
FIG. 2A
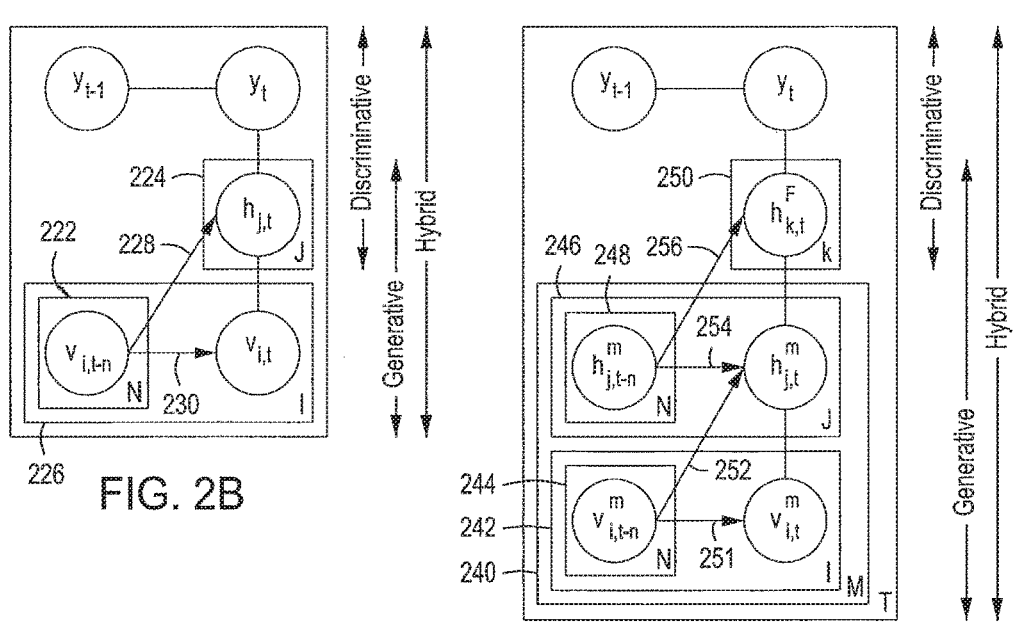
FIG. 2B
FIG. 2C

US 9,875,445 B2

DYNAMIC HYBRID MODELS FOR MULTIMODAL ANALYSIS

CROSS-REFERENCE TO RELATED APPLICATIONS

This application claims the benefit of and priority to U.S. Provisional Patent Application Ser. No. 61/944,079, filed Feb. 25, 2014, which is incorporated herein by this reference in its entirety.

GOVERNMENT RIGHTS

This invention was made in part with government support under contract number W911NF-12-C-001 awarded by the Army Research Office. The U.S. Government has certain rights in this invention.

BACKGROUND

In machine learning, computers are programmed to perform mathematical algorithms that can identify potentially interesting features of data, such as meaningful patterns. The machine learning algorithms create models that can be used to learn feature representations from large data sets. Once feature representations are learned, the trained model can be used to classify new instances of data.

Shallow models, such as Gaussian Mixture Models, Dynamic Bayesian Networks, Conditional Random Fields, Maximum Entropy models, and Support Vector Machines, have been used for event detection in speech. Hierarchical deep networks, linear deep networks such as And-Or Graphs, and non-linear deep networks such as Boltzmann Machines and Neural Networks, have been used in vision, speech, and natural language processing.

Deep learning refers to a machine learning approach for learning representations of data that uses a model architecture having multiple non-linear transformations. A "representation" may refer to a mathematical construct used to identify or communicate something about a piece of data (e.g., a "feature" of the data) in a more structured way. For example, in computer vision, the visual content of a digital image can be represented at a "low level" by a vector of intensity values per pixel, or at a higher level (e.g., in a more abstract way) as a set of edges or regions of interest.

Deep learning architectures can include generative, discriminative, or hybrid models. Hybrid models include both a generative component and a discriminative component. Different approaches to developing hybrid models include joint methods, iterative methods, and staged methods. Joint methods can optimize a single objective function, which consists of both generative and discriminative energies. Iterative methods train the generative and discriminative models in an iterative manner, so that each model influences the other. In staged methods, the generative and discriminative models are trained separately, with the discriminative model being trained on feature representations learned by the generative model. Classification is performed after the training samples are projected into a fixed-dimensional space induced by the generative model.

Restricted Boltzmann Machines (RBMs) can form the building blocks of deep networks models. Deep networks can be trained using the Contrastive Divergence (CD) algorithm. RBMs can be stacked together to form deeper networks known as Deep Boltzmann Machines (DBMs), which capture more complex feature representations. Deep networks-based temporal models include Conditional RBMs (CRBMs) and Temporal RBMs (TRBMs). Conditional Random Fields (CRFs) can be used to label sequential data. CRFs can utilize arbitrary features and model non-stationarities. Hidden Conditional Random Fields (HCRFs) are an extension of CRFs that include hidden states.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

FIGS. 2A-2C are simplified schematic diagrams of embodiments of hybrid models that may be used in connection with the temporal multimodal data analysis system of FIG. 1;

DETAILED DESCRIPTION OF THE DRAWINGS

Figure 1:
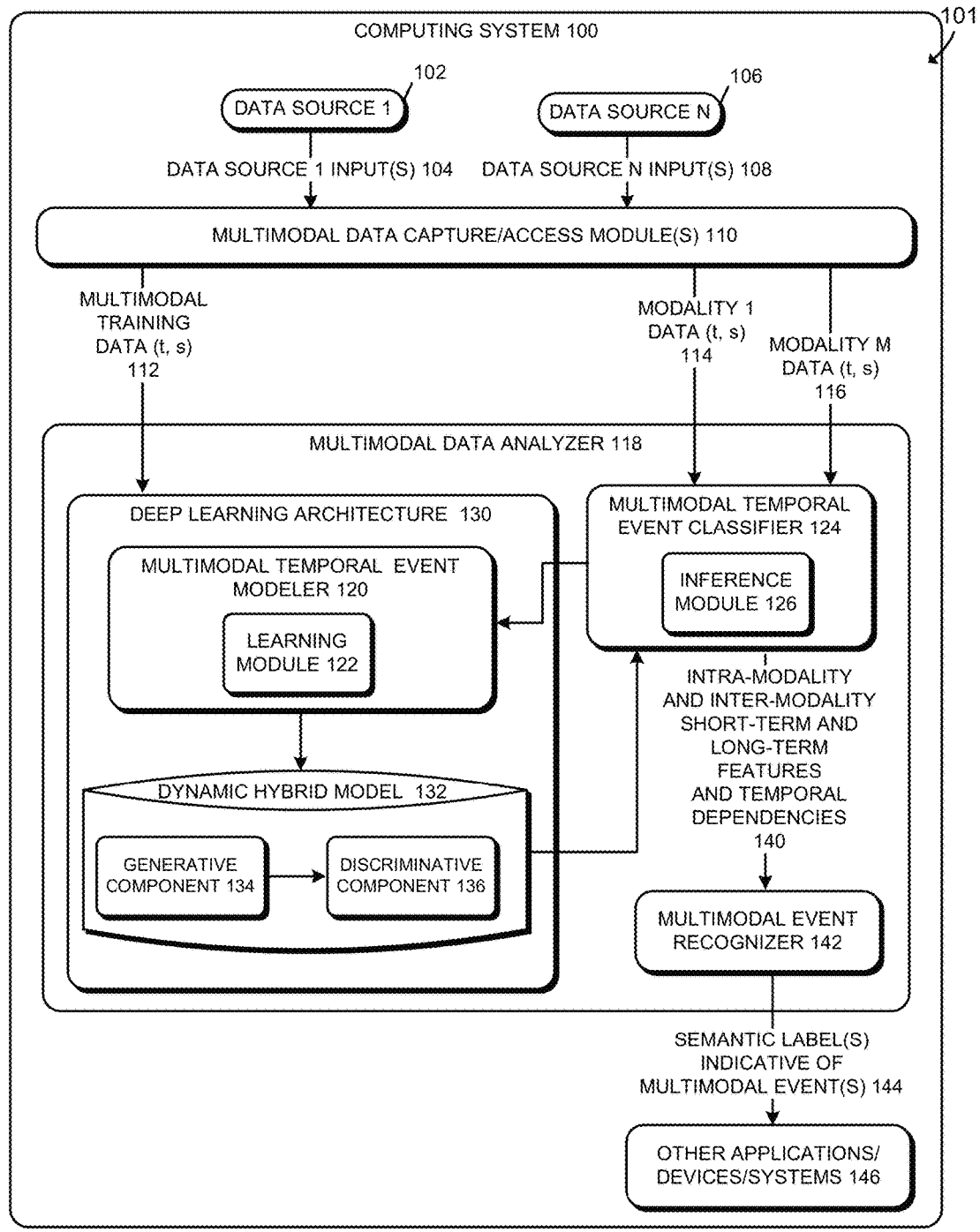
FIG. 1 is a simplified module diagram of at least one embodiment of an environment of a computing system including components for temporal multimodal data analysis as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

This disclosure relates to the technical fields of signal processing and data analysis. Aspects of this disclosure relate to the use of machine learning techniques to build mathematical models that can learn features of multimodal data, and to the use of such models to perform event detection and/or emotion recognition based on a temporal component of the multimodal data. For ease of discussion, in this disclosure, the term "event detection" may be used to refer to the detection of emotion and/or other types of event detection. As used herein, "multimodal data" may refer to one or more sets of data that include at least two different types of data, e.g., different types of sensed environmental data, modes of expression or methods of communication (e.g., speech, visual imagery, tactile, gestures, etc.). Multimodal data may include audio, video, motion, proximity, gaze (e.g., eye focus or pupil dilation), sensed, measured, or computed physiological data (e.g., heart rate, blood pressure, respiration data), other types of sensed, measured, or computed data (e.g., temperature, geographic location, physical orientation with respect to some known reference), and/or other types of data. Additionally, "multimodal" may refer to different sub-categories of data within a broader or more general category or class. For instance, "audio" data may include human speech, music, animal noises, noises made by machines and other devices (e.g., honking horns, airplane takeoff, typing on a keyboard), sounds associated with various activities (e.g., kicking a soccer ball, cutting a watermelon, crowd cheering) and/or other types of sounds. Multimodal data can include live data (e.g., observed in real time, as by a video camera, microphone, or sensing device) or previously captured or recorded data (e.g., video clips, audio files, or measured data, at least temporarily stored in computer memory). While some examples discussed herein relate primarily to the analysis of multimodal data, it should be understood that aspects of the disclosed technologies are equally applicable to any single-modality data that has a temporal component (such as speech).

As used herein, a "temporal component" or "temporal data" may refer to one or more time-varying features, values and/or other characteristics of the data. An example of a temporal component is the "non-stationarity" of the data, e.g., the degree to which a feature of the data changes or does not remain stationary throughout a temporal sequence or series of multimodal data (e.g. in video frames 1-10, a car is traveling at a high speed; but in video frames 11-15 the same car is no longer moving). Another example of a temporal component is the time scale or sampling rate used to collect or analyze the data. For example, audio data, video data, geographic location data, and various different physiological data may all be collected or analyzed over different time intervals and/or at different sampling rates. In some cases, the length of an audio sample needed for speech recognition may be longer than the number of frames needed for feature detection in a video. Thus, the time intervals or time scales of different instances of multimodal data may or may not coincide, and may at least partially overlap in some cases. As used herein, "time scale" may refer to an interval of time whose size can be compared to the size of other time intervals, e.g., a measurable unit of time, such as milliseconds, seconds, hours, minutes, days, etc.

Prior art multimodal deep learning models have not accounted for the temporal aspects of multimodal data. However, many "real life" events are multimodal, with each modality containing a different type of information that may be useful for detecting or recognizing the event. As used herein, "event" may refer to any type of action or activity that may occur in the physical world, and includes, for example, interpersonal interactions, expressions of emotion by an individual or a group, human interactions with machines, devices, food, animals, or other non-human subjects (e.g., a child kicking a ball, a person watching television, etc.), human activities (e.g., dancing, singing, speaking, etc.), events that involve only non-human subjects (e.g., a baseball breaking through a window, a telephone ringing, etc.), weather events and other acts of nature, such as thunderstorms, tornadoes, tsunamis, sunsets, waterfalls, etc.), and/or others.

Prior work in the area of modeling and recognizing events often uses a single modality and neglects other potentially valuable sources of information. A single modality might be sufficient for simple event detection problems, but is inadequate when the events to be detected are complex and/or subtle (e.g., human emotions, facial expressions, events in which there are causal or temporal relationships between sub-events, etc.).

As disclosed herein, embodiments of a computing system 100 are configured to utilize combinations of cues from multiple different modalities to reason about specific events. As used herein, "cue" may refer to any feature, sequence of features, or combination of features detected in the multimodal data. Cues may include, for example, sounds, movements, speech, changes in physiological data, changes in geographic location, and visual features (e.g., faces, objects, people, gestures, gaze, landscapes/scenery, actions, etc.).

Embodiments of the computing system 100 can jointly interpret and reason about the information from different modalities while also accounting for the temporal information within and across the different modalities, using a deep learning architecture. The forms of deep learning architectures disclosed herein and the disclosed applications of such deep learning architectures are believed to be pioneered by the inventors of this patent application.

Referring now to FIG. 1, an embodiment of the computing system 100 is shown in the context of an environment 101 (e.g., a physical or virtual execution or runtime environment). The illustrative computing system 100 includes one or more data sources 102, 106, one or more multimodal data capture/access modules 110 (hereinafter "data access modules 110"), a multimodal data analyzer 118 (which includes a number of subcomponents, described below), and one or more other applications/devices/systems 146. Each of the components 102, 106, 110, 118, 146 of the computing system 100 and their respective subcomponents may be embodied as hardware, software, a combination of hardware and software, or another type of physical component.

The data access modules 110 capture, obtain, receive, or access a number of multimodal inputs 104, 108 from time to time during operation of the computing system 100. The multimodal inputs 104, 108 are generated, transmitted, or otherwise made available by a number "N" (where N is a positive integer greater than one) of data sources 102, 106. The illustrative data sources 102, 106 may be embodied as any hardware, software, or combination of hardware and software capable of performing the functions described herein. For instance, the data sources 102, 106 may include one or more sensing devices (e.g., cameras, microphones, environment sensors, etc.), which "observe" or collect information about a live, "real life" physical setting and capture multimodal data, such as non-verbal and verbal audio inputs, visual imagery, any of the other types of multimodal data mentioned above, and/or others. Alternatively or in addition, the data sources 102, 106 may include computers, computer networks, memory, storage devices, or any other types of devices capable of storing and/or transmitting stored or recorded multimodal data such as audio files, digital image files, video clips, and/or other types of data files.

The illustrative data access modules 110 and each of its sub-components, submodules, and data structures may be embodied as any hardware, software, or combination of hardware and software capable of performing the functions described herein. For example, the data access modules 110 can include data acquisition and signal processing routines, speech recognition and/or natural language understanding modules, low-level feature detection modules, pre-processors, and/or other types of modules that prepare the inputs 104, 108 for use by the multimodal data analyzer 118.

In preparing the inputs 104, 108 for use by the multimodal data analyzer 118, the data access modules 110 may add temporal information to the inputs 104, 108, such as datetime stamps. The data access modules 110 transmit, expose, or otherwise provide the multimodal data analyzer 118 with access to the multimodal inputs 104, 108 as pre-processed. The pre-processed inputs 104, 108 are shown in FIG. 1 as multimodal training data (t,s) 112, modality 1 data (t,s) 114, and modality M data (t,s) 116. The multimodal training data (t,s) 112 is a data set containing many instances of labeled and/or unlabeled multimodal data, which are used to train the dynamic hybrid model 132 (where "labeled" indicates that features of the data have already been identified, e.g., handcrafted by manual tagging, enabling the use of supervised machine learning, and "unlabeled" indicates "raw" multimodal data for which unsupervised machine learning is used). The modality 1 data (t,s) 114 and modality M data (t,s) 116 are new instances of unlabeled multimodal data that are not contained in the training data 112, where "M" is a positive integer greater than zero, and M may be different than N (e.g., a single data source may provide multiple modalities or multiple data sources may provide different instances of the same modality, e.g., two different microphones). The designations "(t,s)" are provided simply for ease of discussion, as an indication in FIG. 1 that, in the illustrative embodiment, each instance of the data 112, 114, 116 has a temporal component represented by at least t=timestamp and/or s=sampling rate (or sample size/duration).

The illustrative multimodal data analyzer 118 and each of its sub-components, submodules, and data structures may be embodied as any hardware, software, or combination of hardware and software capable of performing the functions described herein. For ease of discussion, and as described in more detail below, the multimodal data analyzer 118 is shown as including both the functionality for constructing a dynamic hybrid model 132 using multimodal training data 112 (e.g., components 120, 122, 130) and the functionality for event detection in new data samples 114, 116 (e.g., components 124, 126, 142). In other embodiments, the model building and event detection functionality may be implemented as separate components or on different computing devices or systems.

The multimodal data analyzer 118 utilizes a deep learning architecture 130 to build a dynamic hybrid model 132. As used herein, "dynamic" refers to the ability of the model 132 to account for the time-varying features and/or non-stationarity of the multimodal data. In the deep learning architecture, low-level feature extraction, detection, and fusion (e.g., joint representation) of the low-level features of the multiple different data streams can occur. Low-level feature detection involves processing the raw streams of the various different types of multi-modal data to recognize the low-level features depicted therein or represented thereby. Such processing may be done for multiple modalities in parallel (e.g., concurrently across multiple modalities) or sequentially, or independently of other modalities, or in an integrated fashion.

Early, intermediate, and/or late fusion techniques may be used in the analysis of the multimodal data. Early fusion techniques can fuse the various multimodal streams of data together first and then perform feature detection on the fused stream. Late fusion techniques perform feature detection on the separate streams of data first and then fuse the streams together later. "Intermediate" fusion refers to a technique, such as the disclosed technique developed by the inventors, which enables the level of fusion to be learned, meaning that the optimization is set up in a manner that chooses the right point on the continuum between early and late fusion through the use of data driven learning. For example, as disclosed herein and discussed in more detail in the aforementioned U.S. Provisional Patent Application Ser. No. 61/944,079, embodiments of the system 100 can perform multimodal data fusion using a dynamic hybrid model that includes a "neuro-inspired" component such as Conditional Restricted Boltzmann Machines (CRBMs).

The dynamic hybrid model 132 is used to create a multimodal temporal event classifier 124. To build the dynamic hybrid model 132, the multimodal temporal event modeler 120, including a learning module 122, executes deep learning algorithms on the multimodal training data (t,s) 112, as described in more detail below. The dynamic hybrid model 132 includes a generative component 134 and a discriminative component 136. The dynamic hybrid model 132 can be implemented in software, hardware, or a combination of software and hardware. For example, portions of the dynamic hybrid model 132 may be implemented as computer program code, logic, instructions, and/or data structures such as vectors, arrays, trees, graphs, etc. Illustrative embodiments of the dynamic hybrid model 132 are described in more detail below.

The illustrative multimodal temporal event classifier 124, including an inference module 126, classifies sets of time-varying multimodal data 114, 116 using the dynamic hybrid model 132. The classifier 124 can be embodied as an automated tool that can be called upon by other applications, systems, devices, services, or processes, to perform multimodal data analysis. As described in more detail below, the multimodal temporal event classifier 124 identifies intra-modality and inter-modality short-term and long-term features and temporal dependencies 140, of the multimodal data 114, 116. Classification results produced by the multimodal temporal event classifier 124 can be fed back to the deep learning architecture 130 as shown by the arrow connecting the classifier 124 to the multimodal temporal event modeler 120.

An example of intra-modality short-term features includes changes in the shape of a person's lips over time: at time t1, the lips are straight and close together; at time t2, the ends of the lips are curled upward/downward; at time t3, there is vertical space between the lips. A long-term feature that may be inferred from this combination of short-term features and their temporal dependencies (e.g., time t2 follows time t1 and time t3 follows time t2) is that the person is beginning to laugh. The foregoing example is intra-modal because all of the detected features are visual.

An example of inter-modality short term features includes: at time t1, a red car is detected in front of a building; at time t2, the red car is detected slightly past the same building; at time t3, a braking sound is detected; at time t4, a "crunch" sound is heard. A long-term feature that may be inferred from this combination of short-term features and their temporal dependencies (e.g., time t2 follows time t1, time t3 overlaps or follows time t2, time t4 overlaps or follows time t3) is that the red car was involved in a crash. The red car example is inter-modal because some of the detected features are visual and some of the detected features are audio.

The illustrative multimodal event recognizer 142 associates semantic labels indicative of multimodal event(s) 144 with one or more of the short-term and long-term features and temporal dependencies 140 (e.g., as meta-tags or annotations). The semantic label(s) 144 can be embodied as human-intelligible descriptive labels, e.g., as natural language words or phrases that describe one or more features of the multimodal data 114, 116, as opposed to numerical values or computer code. The semantic label(s) 144 can be embodied as, for example, text and/or system-generated verbal output (which can be produced using, e.g., a natural language generator (NLG) and a text-to-speech (TTS) module).

The multimodal event recognizer 142 supplies or otherwise makes available the semantic label(s) 144 to one or more other applications, devices, systems, services, or processes 146, which may have requested the multimodal data analysis. For example, the multimodal event recognizer 142 may transmit, expose, or otherwise make available the semantic label(s) 144 to a search engine, an event detector component of a computer vision application programming interface (API) or toolbox, a human-computer interface module, a navigation system, a gaming system, a virtual reality or augmented reality system, a virtual personal assistant system, a communication system (such as a messaging system, e.g., email, text, voice, or multimodal messaging, social media, video conferencing system, etc.), a health monitoring device or system, and/or any number of other requesting systems, applications, devices, services or processes. Alternatively or in addition, the multimodal event recognizer 142 may simply cause the semantic label(s) to be stored in computer memory (e.g., by updating a searchable data store) for later use/access by one or more requesters.

Referring now to FIG. 2A, a simplified illustration of an embodiment 200A of the dynamic hybrid model 132, including the generative component 134 and the discriminative component 136, is shown. In FIG. 2A, raw (e.g., unlabeled) multimodal data having a temporal component (t,s) 202 is analyzed by a temporal generative model 204. The temporal generative model 204 generates a feature representation 206 that identifies short term temporal features of the multimodal data 202. The illustrative feature representation 206 is embodied as a joint representation (e.g., intermediate fusion) as disclosed herein. The feature representation 206 is fed into a temporal discriminative model 208. The temporal discriminative model 208 performs higher level reasoning on the feature representation 206 and infers long-term temporal features and dependencies 210 from the short term feature representation 206. As used herein, "short term" and "long term" are relative terms whose exact values will be determined by the requirements of a particular design of the system 100. In some cases, short term may refer to the time or number of frames needed to detect a visual feature while long term may refer to the time or number of frames needed to detect an audio feature. In other cases, short and long term may be defined by different units of temporal measurement, e.g., milliseconds and seconds, or by the characteristics of the detected features themselves. In general, a long term feature may include a period of time in which more than one short term feature occurs, and may include short term features from different multimodal data streams.

In general, the embodiment 200A uses temporal deep networks to perform multimodal fusion of temporal data. The temporal generative model 204 may be embodied as a non-linear generative model, which is used to analyze the time series data. The temporal generative model 204 may utilize Conditional Restricted Boltzmann Machines (CRBMs). The CRBM uses an undirected model with binary latent variables connected to a number of visible variables. The CRBM-based generative model 204 enables modeling short-term multimodal phenomenon and also can account for missing data by generating the missing data within or across modalities. The temporal discriminative model 208 may be embodied as a Conditional Random Field (CRF)-based discriminative model, which can model long-term temporal dynamics.

The embodiment 200A utilizes a staged hybrid architecture, in which the generative part 204 (e.g., CRBM) captures short term (e.g., intra-utterance/intra-modality) dynamics, while the discriminative part 208 (e.g., CRF) captures the long term (inter-utterance/inter-modality) correlations. Experimental results described more fully in the aforementioned Provisional Patent Application Ser. No. 61/944,079 have shown that the disclosed approach of jointly modeling the temporal content from different modalities substantially improves both classification and generation performance, thereby enabling effective modeling of multimodal data sequences that are non-stationary and have multiple time scales.

Referring now to FIG. 2B, a simplified illustration of an embodiment 200B of the dynamic hybrid model 132 is shown. The embodiment 200B is configured as a staged hybrid model for emotion detection in speech. The hybrid model 200B includes a generative model, which is used for unsupervised representation learning of short term temporal phenomena, and a discriminative model, which is used for event detection and classification of long range temporal dynamics. The temporal generative model learns a rich and compact feature representation capable of encoding a variety of low level concepts. The discriminative model performs high level reasoning. Experimental results described more fully in the aforementioned Provisional Patent Application Ser. No. 61/944,079 were obtained on multiple audio-visual datasets (e.g., AVEC, VAM, and SPD) and have shown that an embodiment of the hybrid model 200B performed better than the state-of-the-art.

Applications of the model 200B include detecting the emotional content in human speech, for use in tutoring systems to detect student state, for identifying distressed phone calls automatically, etc. Recognizing emotions from speech is a very challenging problem, primarily because different people express emotions in different ways. Moreover, much of the emotional content in speech is contained in the form of language, and when this linguistic content is removed, the "paralinguistic" problem becomes challenging even for humans (e.g., recognizing the emotions from speech content in a language one does not understand).

FIG. 2B illustrates a graphical representation of a hybrid model 200B as disclosed herein. Each circle represents a state of the speech data at a time instance. The state is determined based on a combination of speech features from different time instances. The model 200B also graphically illustrates associations, dependencies and/or relationships between and among the various states (represented by arrows 228, 230). These dependencies can be used in combination with the state information to analyze the impact of one state on another state. The rectangular blocks 222, 224, 226 of the model 200B illustrate both time-specific and time varying features. For example, the block 222 represents a time-specific state, while the block 224 represents a sequence of states occurring over time. As shown by the blocks 222, 224, the state sequences can overlap in time (e.g., portions of block 224 overlap with block 222). This is possible because the durations of the state sequences can be defined by the detected features themselves, rather than being imposed thereon.

A highly simplified description of a mathematical representation of the hybrid model 200B follows. Additional details can be found in the aforementioned Provisional Patent Application Ser. No. 61/944,079. Let $y_t$ be a multi-class label vector at time t, $v_t$ is the vector of raw features at time t, and $h_t$ is a vector of the latent hidden variables. $v_{<t}$ is the concatenated history vector of the visible nodes. The hybrid model can then be defined as:

$$\underbrace{p(y_t, v_t, h_t | v_{<t})}_{\text{Hybrid}} = \underbrace{p_D(y_t | h_t)}_{\text{Discriminative}} \cdot \underbrace{p_G(v_t, h_t | v_{<t})}_{\text{Generative}}.$$

The hybrid model P(Yt,vt,ht/v<t) consists of two terms, a generative term pD(yt/ht,vt), and a discriminative term PD(Yt/ht,vt). FIG. 2B shows a graphical illustration of the hybrid model. In FIG. 2B, v are the visible nodes, h are the hidden nodes, and y is the per frame label. Illustratively, the generative component is embodied as a generative CRBM model, and the discriminative component is embodied as a discriminative CRF model. An illustrative set of math equations for defining the generative CRBM and the discriminative CRF is set forth in the aforementioned Provisional Patent Application Ser. No. 61/944,079.

Inference algorithms that may be used by the inference module 126 are described in more detail in Provisional Patent Application Ser. No. 61/944,079. Briefly, the hidden nodes at time (t) are conditionally independent given data at previous time instances [(t−N), ... , (t−1)]. Inference can be done in a layer-wise manner by activating a hidden layer given the visible layer using the conditional independence advantage of the CRBM model p(h(j=1/v), Given a new observation sequence $h_t$ and model parameters θ obtained during training, the label $\hat{y}_t$ is predicted by maximizing over all of the labels.

Learning algorithms that may be used by the learning module 122 are described in more detail in Provisional Patent Application Ser. No. 61/944,079. Illustratively, the gradient of a Contrastive Divergence (CD) function is followed. The learning rules are derived using CD, where (•)data is the expectation with respect to the data distribution and (•)recon is the expectation with respect to the reconstructed data. The reconstruction is generated by first sampling $p(h_j=1|v)$ for all the hidden nodes in parallel. The visible nodes are then generated by sampling $p(v_i|h)$ for all the visible nodes in parallel.

Referring now to FIG. 2C, a simplified illustration of an embodiment 200C of the dynamic hybrid model 132 is shown. The embodiment 200C is configured as a staged hybrid model for event detection in time-varying multimodal data (e.g., audio-visual data). The embodiment 200C includes a generative model that is capable of learning a homogeneous joint feature representation that captures low level concepts from multiple heterogeneous data sources, and a discriminative model for high level reasoning. The hybrid model 200C combines the advantages of temporal generative and discriminative models, forming an extendable formal fusion framework for classifying multimodal data at multiple time scales. Additionally, the model 200C can handle missing data both within and across modalities.

The model 200C is configured for detecting multimodal events in time varying data sequences. The model 200C utilizes a deep temporal generative model for unsupervised learning of a shared representation across multiple modalities with time varying data. The temporal generative model takes into account short term temporal phenomena and allows for filling in missing data by generating data within or across modalities. The temporal generative model is augmented with a Conditional Random Field based temporal discriminative model for event detection, classification, and generation, which enables modeling long range temporal dynamics.

FIG. 2C illustrates a graphical representation of the hybrid model 200C, in which the circles, boxes 240, 242, 244, 246, 248, 250, and arrows 251, 252, 254, 256 are used in the same manner as in FIG. 2B, described above. For example, the boxes represent possible state sequences, the arrows represent inter-state dependencies, and the circles represent individual states. Hidden states are designated by h, and observable states are designated by v. In some embodiments, hidden states can be revealed by the modeling technique, e.g., by the application of hidden-state conditional random fields. In some cases, the hidden states can represent meaningful details that would otherwise not be apparent.

A highly simplified description of a mathematical representation of the hybrid model 200C follows. Additional details can be found in the aforementioned Provisional Patent Application Ser. No. 61/944,079. The multimodal fusion hybrid model $\rho(y_t,v_t,h_t/v_{<t})$ is decomposed into two terms, a generative component $\rho(y_t,v_t,h_t/v_{<t})$, and a discriminative component $\rho(y_t,v_t)$, The multi-class label vector at time t, $v_t$ is the vector of raw features at time t, and $h_t$ is a vector of the latent hidden variables. The $v_{<t}$ is a concatenated history vector of the visible nodes. In this model, $y_t$ is independent of $v_t$ given $h_t$, i.e. $\rho(y_t|v_t,h_t)=\rho(y_t|h_t)$. For the generative component, a Gibbs distribution is defined over a multimodal network of stacked CRBMs, thereby enabling the temporal nature of the multimodal data to be modeled. For the discriminative component, a Gibbs distribution of a CRF model is used.

Inference algorithms that may be used by the inference module 126 for handling multimodal data are similar to those mentioned above and are described more fully in Provisional Patent Application Ser. No. 61/944,079. Learning algorithms that may be used by the learning module 122 for handling multimodal data are similar to those mentioned above and are described more fully in Provisional Patent Application Ser. No. 61/944,079. Experimental results described more fully in the aforementioned Provisional Patent Application Ser. No. 61/944,079 were obtained on multiple audio-visual datasets (e.g., AVEC, AVLetters, CUAVE) and have shown that an embodiment of the hybrid model 200C performed better than the state-of-the-art.

Figure 3:
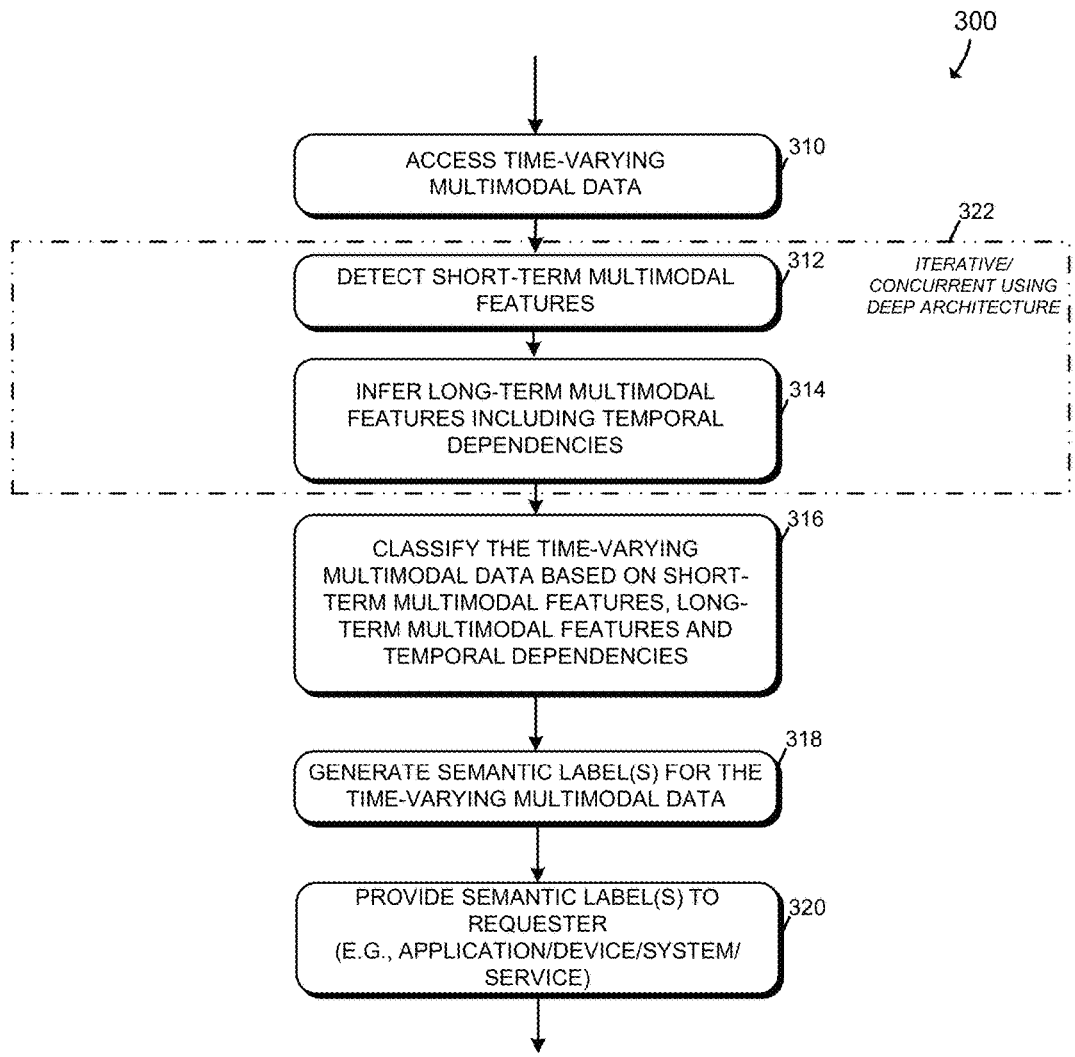
FIG. 3 is a simplified flow diagram of at least one embodiment of a method by which the system of FIG. 1 may perform temporal multimodal data analysis, recognize temporal multimodal events, and/or perform emotion recognition.

Referring now to FIG. 3, an illustrative method 300 for event detection in multimodal data is shown. The method 300 may be embodied as computerized programs, routines, logic and/or instructions of the computing system 100, of the data access module 110 and/or the multimodal data analyzer 118, for example. At block 310, the system 100 accesses time-varying multimodal data, such as audio and video data streams, or a variety of different multimodal data streams having time-varying data sequences. Loop 322 signifies that blocks 312, 314 can be performed iteratively and/or concurrently, using the deep architecture described above. In block 312, the system 100 detects one or more short term multimodal features in the multimodal data obtained in block 310. To do this, the system 100 utilizes a temporal generative component of the deep learning architecture (e.g., generative component 134 of dynamic hybrid model 132).

In block 314, the system 100 infers one or more long-term multimodal features and/or temporal dependencies in the multimodal data, based on the output of block 312. To do this, the system 100 uses a temporal discriminative component such as discriminative component 136 of dynamic hybrid model 132. In block 316, the system 100 classifies the instances of time-varying multimodal data based on the short-term multimodal features detected in block 312, and the long term multimodal features and temporal dependencies inferred in block 314. For example, the system 100 may reason that a visual feature indicative of lightning detected in frame 2 is related to an audio feature indicative of thunder detected in frame 4. The multimodal data can be considered non-stationary or time-varying because the lightning may be detected only in frame 2 and not in other frames, and the thunder may be detected only in frame 4 and not in other frames of the video. In block 318, the system 100 generates one or more semantic labels for the time-varying multimodal data based on the results of blocks 312, 314, and 316. For example, the system 100 may label the combination of visual features of frame 2 and audio features of frame 4 as a "thunderstorm." Semantic labels can be associated with feature classifications using, for example, an ontology or a mapping table. In block 320, the system 320 supplies the semantic label(s) established in block 318 to a requesting application, device, system or service, or simply stores the semantic labels for future use.

Example Usage Scenarios

The components of the temporal multimodal data analysis system 100 have a number of different applications. Embodiments of the system 100 can enable recognition of multimodal affect and modeling of interpersonal (e.g., social) interactions. Embodiments of the system 100 can enable fluid, lifelike human-computer interaction for a variety of applications including training, machine operation, operating remotely piloted aircraft, large scale surveillance and security systems, flight control systems, video games, navigation, etc.

Embodiments of the system 100 can be used in the interpretation, search, retrieval, and/or classification of multimodal data. For example, embodiments of the system 100 can be used to automatically interpret and classify online video content and/or to make content recommendations. Embodiments of the system 100 can perform multimodal interpretation, e.g., affect or sentiment analysis, or complex event analysis, using the multimodal data (e.g., for automated video analysis). For instance, an automated image, video, or multimodal message analysis may include a sentiment analysis that may be performed based on a combination of speech, non-verbal audio, and visual features (e.g., tone, background audio, spoken words, displayed text and graphics, activities, and/or other multimodal features) of images or video.

Embodiments of the system 100 can make correlations, such as temporal and/or cause and effect relationships, between different multimodal data streams, e.g., to determine how data streams of multiple different modalities are related, particularly when the data streams, or events in the data streams, are not temporally aligned (e.g., lightning at time t1 in visual data stream+thunder at time t2 in audio data stream). Embodiments of the system 100 can model "subphenomena" such as very short term events, and then connect the short term events together to draw an inference or generalize the short term events into a larger or more abstract event category. Embodiments of the system can be used to improve the capabilities of virtual personal assistant applications including smart calendar applications, health and fitness monitoring applications, spoken dialog based automated assistants, social media applications, and multimodal messaging applications (e.g., messaging systems that permit a combination of audio or video messages and text messages).

Implementation Examples

Figure 4:
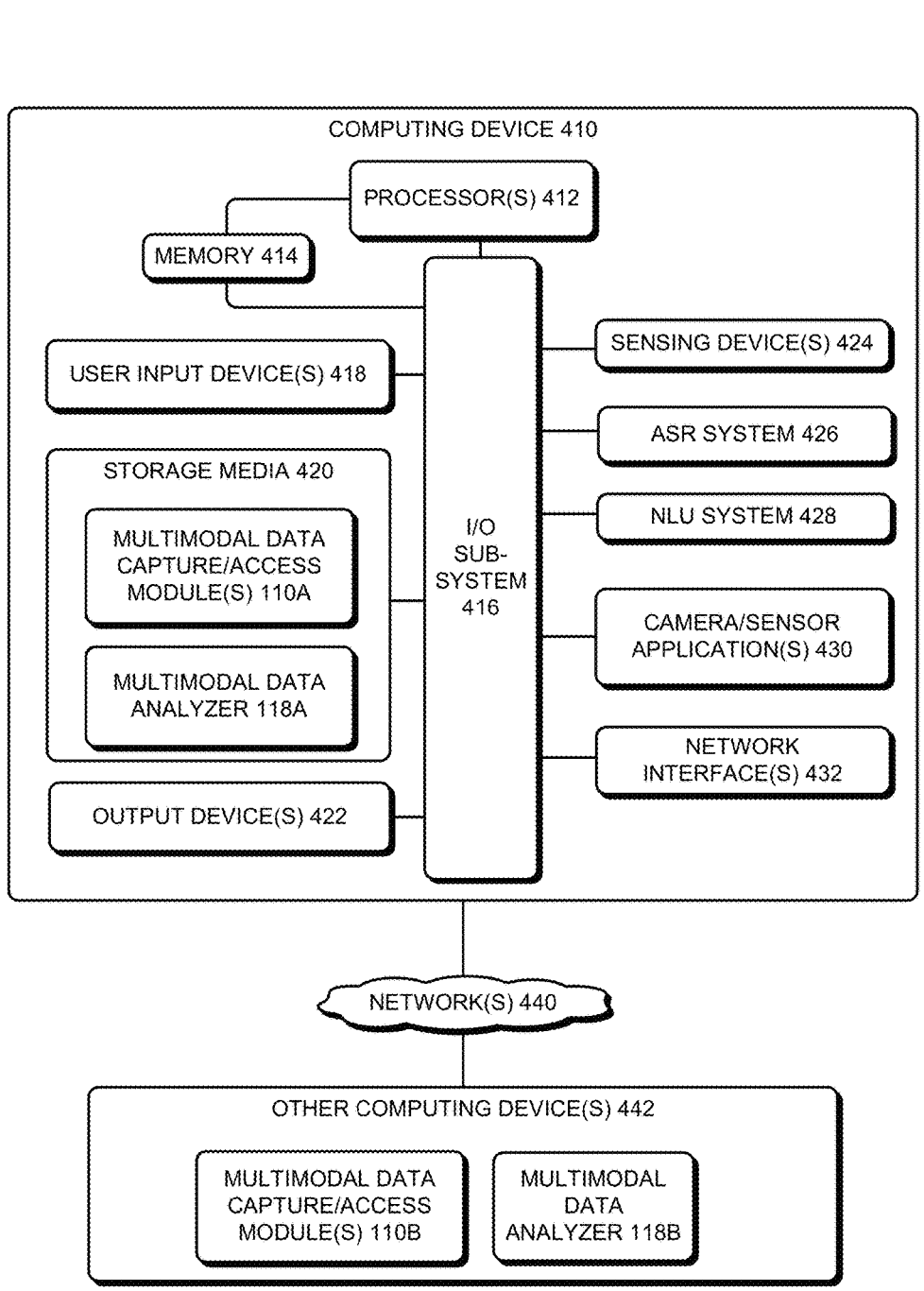
FIG. 4 is a simplified block diagram of an exemplary computing environment in connection with which at least one embodiment of the system of FIG. 1 may be implemented.

Referring now to FIG. 4, a simplified block diagram of an exemplary computing environment 400 for the computing system 100, in which the multimodal data analyzer 118 may be implemented, is shown. The illustrative implementation 400 includes a computing device 410, which may be in communication with one or more other computing systems or devices 442 via one or more networks 440. Illustratively, a portion 118A of the multimodal data analyzer 118 is local to the computing device 410, while another portion 118B is distributed across one or more of the other computing systems or devices 442 that are connected to the network(s) 440. For example, in some embodiments, portions of the dynamic hybrid model 132 may be stored locally while other portions are distributed across a network (and likewise for other components of the multimodal data analyzer 118). In some embodiments, however, the multimodal data analyzer 118 may be located entirely on the computing device 410. Similarly, a portion 110A of the multimodal data capture/access module(s) 110 may be local to the computing device 410 while another portion 110B is distributed across one or more of the other computing systems or devices 442 that are connected to the network(s) 440, or the module(s) 110 may all be located on the computing device 410.

In some embodiments, portions of the multimodal data analyzer 118 and/or the multimodal data capture/access module(s) 110 may be incorporated into other systems or interactive software applications. Such applications or systems may include, for example, operating systems, middleware or framework (e.g., application programming interface or API) software, and/or user-level applications software (e.g., a search engine, a virtual personal assistant, a messaging application, a web browser, another interactive software application or a user interface for a computing device).

The illustrative computing device 410 includes at least one processor 412 (e.g. a microprocessor, microcontroller, digital signal processor, etc.), memory 414, and an input/output (I/O) subsystem 416. The computing device 410 may be embodied as any type of computing device such as a personal computer (e.g., a desktop, laptop, tablet, smart phone, wearable or body-mounted device, etc.), a server, an enterprise computer system, a network of computers, a combination of computers and other electronic devices, or other electronic devices. Although not specifically shown, it should be understood that the I/O subsystem 416 typically includes, among other things, an I/O controller, a memory controller, and one or more I/O ports. The processor 412 and the I/O subsystem 416 are communicatively coupled to the memory 414. The memory 414 may be embodied as any type of suitable computer memory device (e.g., volatile memory such as various forms of random access memory).

The I/O subsystem 416 is communicatively coupled to a number of components including one or more user input devices 418 (e.g., a touchscreen, keyboard, virtual keypad, microphone, etc.), one or more storage media 420, one or more output devices 422 (e.g., speakers, LEDs, etc.), one or more sensing devices 424, an automated speech recognition (ASR) system 426, a natural language understanding (NLU) system 428, one or more camera or other sensor applications 430 (e.g., software-based sensor controls), and one or more network interfaces 432.

The sensing device(s) 424 may include, for instance, a microphone, a video camera, a still camera, an electro-optical camera, a thermal camera, a motion sensor or motion sensing system (e.g., the MICROSOFT KINECT system), an accelerometer, a proximity sensor, a geographic location system (e.g., Global Positioning System or GPS), a temperature sensor, a physiological sensor (e.g., heart rate and/or respiration rate sensor) and/or any other type of sensor that may be useful to capture multimodal data. The sensing device(s) 424 may be embodied as hardware, software, or a combination of hardware and software (e.g., a hardware receiver/transmitter in combination with signal processing software).

The ASR system 426 identifies spoken words and/or phrases in verbal inputs and, in some embodiments, translates them to text form. There are many ASR systems commercially available; one example is the DYNASPEAK system, available from SRI International. The NLU system 428 can associate semantics with the words identified by the ASR system 426, i.e., for disambiguation. An example of an NLU system is the Natural Language Understanding Toolkit, available from SRI International.

The storage media 420 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), the multimodal data capture/access module(s) 110 and/or the multimodal data analyzer 118 reside at least temporarily in the storage media 420. Portions of systems software, framework/middleware, the multimodal data capture/access module(s) 110 and/or the multimodal data analyzer 118 may be copied to the memory 414 during operation of the computing device 410, for faster processing or other reasons.

The one or more network interfaces 432 may communicatively couple the computing device 410 to a network, such as a local area network, wide area network, personal cloud, enterprise cloud, public cloud, and/or the Internet, for example. Accordingly, the network interfaces 432 may include one or more wired or wireless network interface cards or adapters, for example, as may be needed pursuant to the specifications and/or design of the particular computing system 400. The network interface(s) 432 may provide short-range wireless or optical communication capabilities using, e.g., Near Field Communication (NFC), wireless fidelity (Wi-Fi), radio frequency identification (RFID), infrared (IR), or other suitable technology.

The other computing system(s) 442 may be embodied as any suitable type of computing system or device such as any of the aforementioned types of devices or other electronic devices or systems. For example, in some embodiments, the other computing systems 442 may include one or more server computers used to store portions of the dynamic hybrid model 132. The computing system 400 may include other components, sub-components, and devices not illustrated in FIG. 4 for clarity of the description. In general, the components of the computing system 400 are communicatively coupled as shown in FIG. 4 by electronic signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

An example 1 includes a multimodal data analyzer comprising instructions embodied in one or more non-transitory machine accessible storage media, the multimodal data analyzer configured to cause a computing system comprising one or more computing devices to: access a set of time-varying instances of multimodal data having at least two different modalities, each instance of the multimodal data having a temporal component; and algorithmically learn a feature representation of the temporal component of the multimodal data using a deep learning architecture.

An example 2 includes the subject matter of example 1, configured to classify the set of multimodal data by applying a temporal discriminative model to the feature representation of the temporal component of the multimodal data. An example 3 includes the subject matter of example 1 or example 2, and is configured to, using the deep learning architecture, identify short-term temporal features in the multimodal data. An example 4 includes the subject matter of any of examples 1-3, wherein the multimodal data comprises recorded speech and the multimodal data analyzer is configured to identify an intra-utterance dynamic feature of the recorded speech. An example 5 includes the subject matter of any of examples 1-4, and is configured to, using the deep learning architecture, identify a long-term temporal feature in the multimodal data. An example 6 includes the subject matter of any of examples 1-5, wherein the multimodal data comprises recorded speech and the multimodal data analyzer is configured to identify an inter-utterance dynamic feature in the recorded speech. An example 7 includes the subject matter of any of examples 1-6, wherein the multimodal data comprises audio and video, and the multimodal data analyzer is configured to (i) identify short-term dynamic features in the audio and video data and (ii) infer a long-term dynamic feature based on a combination of temporally-spaced audio and video short-term dynamic features. An example 8 includes the subject matter of any of examples 1-7, wherein the temporal deep learning architecture comprises a hybrid model having a generative component and a discriminative component, and wherein the multimodal data analyzer uses output of the generative component as input to the discriminative component. An example 9 includes the subject matter of any of examples 1-8, wherein the multimodal data analyzer is configured to identify at least two different temporally-spaced events in the multimodal data and infer a correlation between the at least two different temporally-spaced multimodal events. An example 10 includes the subject matter of any of examples 1-9, and is configured to algorithmically learn the feature representation of the temporal component of the multimodal data using an unsupervised machine learning technique. An example 11 includes the subject matter of any of examples 1-10, and is configured to algorithmically infer missing data both within a modality and across modalities An example 12 includes a method for classifying multimodal data, the multimodal data comprising data having at least two different modalities, the method comprising, with a computing system comprising one or more computing devices: accessing a set of time-varying instances of multimodal data, each instance of the multimodal data having a temporal component; and algorithmically classifying the set of time-varying instances of multimodal data using a discriminative temporal model, the discriminative temporal model trained using a feature representation generated by a deep temporal generative model based on the temporal component of the multimodal data.

An example 13 includes the subject matter of example 12, and includes identifying, within each modality of the multimodal data, a plurality of short-term features having different time scales. An example 14 includes the subject matter of example 13, and includes, for each modality within the multimodal data, inferring a long-term dynamic feature based on the short-term dynamic features identified within the modality. An example 15 includes the subject matter of example 13, and includes fusing short-term features across the different modalities of the multimodal data, and inferring a long-term dynamic feature based on the short-term features fused across the different modalities of the multimodal data.

An example 16 includes a system for algorithmically recognizing a multimodal event in data, the system including: a data access module to access a set of time-varying instances of multimodal data, each instance of the multimodal data having a temporal component; a classifier module to classify different instances in the set of time-varying instances of multimodal data as indicative of different short-term events; and an event recognizer module to (i) recognize a longer-term multimodal event based on a plurality of multimodal short-term events identified by the classifier module and (ii) generate a semantic label for the recognized multimodal event. An example 17 includes the subject matter of example 16, wherein the classifier module is to apply a deep temporal generative model to the temporal component of the audio-visual data. An example 18 includes the subject matter of example 17, wherein the event recognizer module is to use a discriminative temporal model to recognize the longer-term multimodal event. An example 19 includes the subject matter of example 18, wherein the system is to train the discriminative temporal model using a feature representation generated by the deep temporal generative model. An example 20 includes the subject matter of any of examples 16-19, wherein the event recognizer module is to recognize the longer-term multimodal event by correlating a plurality of different short-term multimodal events having different time scales.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A multimodal data analyzer comprising instructions embodied in one or more non-transitory machine accessible storage media, the multimodal data analyzer configured to cause a computing system comprising one or more computing devices to:
   access a set of time-varying instances of multimodal data having at least two different modalities, each instance of the multimodal data having a temporal component;
   algorithmically learn a feature representation of the temporal component of the multimodal data using a deep learning architecture and a fusion technique which enables a level of fusion of the multimodal data to be learned; and
   infer at least one of long-term feature representations or temporal dependencies between feature representations of the multimodal data.

2. The multimodal data analyzer of claim 1, configured to classify the set of multimodal data by applying a temporal discriminative model to the feature representations of the temporal component of the multimodal data having inferred temporal dependencies.

3. The multimodal data analyzer of claim 1, configured to, using the deep learning architecture, identify short-term temporal features in the multimodal data.

4. The multimodal data analyzer of claim 1, wherein the multimodal data comprises recorded speech and the multimodal data analyzer is configured to identify an intra-utterance dynamic feature of the recorded speech.

5. The multimodal data analyzer of claim 1, configured to, using the deep learning architecture, identify a long-term temporal feature in the multimodal data.

6. The multimodal data analyzer of claim 1, wherein the multimodal data comprises recorded speech and the multimodal data analyzer is configured to identify an inter-utterance dynamic feature in the recorded speech.

7. The multimodal data analyzer of claim 1, wherein the multimodal data comprises audio and video, and the multimodal data analyzer is configured to (i) identify short-term dynamic features in the audio and video data and (ii) infer a long-term dynamic feature based on a combination of temporally-spaced audio and video short-term dynamic features.

8. The multimodal data analyzer of claim 1, wherein the temporal deep learning architecture comprises a hybrid model having a generative component and a discriminative component, and wherein the multimodal data analyzer uses output of the generative component as input to the discriminative component.

9. The multimodal data analyzer of claim 1, wherein the multimodal data analyzer is configured to identify at least two different temporally-spaced events in the multimodal data and infer a correlation between the at least two different temporally-spaced multimodal events.

10. The multimodal data analyzer of claim 1, configured to algorithmically learn the feature representation of the temporal component of the multimodal data using an unsupervised machine learning technique.

11. The multimodal data analyzer of claim 1, configured to algorithmically infer missing data both within a modality and across modalities.

12. A method for classifying multimodal data, the multimodal data comprising data having at least two different modalities, the method comprising, with a computing system comprising one or more computing devices:
    accessing a set of time-varying instances of multimodal data, each instance of the multimodal data having a temporal component; and
    algorithmically classifying the set of time-varying instances of multimodal data using a discriminative temporal model, the discriminative temporal model trained using a feature representation generated by a deep temporal generative model based on the temporal component of the multimodal data and a fusion technique which enables a level of fusion of the multimodal data to be learned.

13. The method of claim 12, comprising identifying, within each modality of the multimodal data, a plurality of short-term features having different time scales.

14. The method of claim 13, comprising, for each modality within the multimodal data, inferring a long-term dynamic feature based on the short-term dynamic features identified within the modality.

15. The method of claim 13, comprising fusing short-term features across the different modalities of the multimodal data, and inferring a long-term dynamic feature based on the short-term features fused across the different modalities of the multimodal data.

16. A system embodied in one or more computer accessible storage media for algorithmically recognizing a multimodal event in data, the system comprising:
    a data access module to access a set of time-varying instances of multimodal data, each instance of the multimodal data having a temporal component;
    a classifier module to classify different instances in the set of time-varying instances of multimodal data as indicative of different short-term events, wherein the classifying includes the use of a discriminative temporal model trained using a feature representation generated by a deep temporal generative model based on the temporal component of the multimodal data and a fusion technique which enables a level of fusion of the multimodal data to be learned; and
    an event recognizer module to (i) recognize a longer-term multimodal event based on a plurality of multimodal short-term events identified by the classifier module and (ii) generate a semantic label for the recognized multimodal event.

17. The system of claim 16, wherein the event recognizer module is to use a discriminative temporal model to recognize the longer-term multimodal event.

18. The system of claim 17, wherein the system is to train the discriminative temporal model using a feature representation generated by the deep temporal generative model.

19. The system of claim 16, wherein the event recognizer module is to recognize the longer-term multimodal event by correlating a plurality of different short-term multimodal events having different time scales.

20. The system of claim 16, wherein the fusion technique comprises a neuro-inspired dynamic hybrid model, which enables the level of fusion of the multimodal data to be learned through the use of data driven learning.

\* \* \* \* \*